United States Patent [19]

Bronsema et al.

[11] Patent Number: 5,669,992
[45] Date of Patent: Sep. 23, 1997

[54] BUMPER BEAM MAKING PROCESS

[76] Inventors: Brand Bronsema, 725 Prairie Creek, Ionia, Mich. 48846; Jeffrey A. Anderson, 425 Breezy Pt., Clarksville, Mich. 48815; John J. Kary, 199 S. Cranbrook Cross Rd., Bloomfield, Mich. 48301

[21] Appl. No.: 593,393
[22] Filed: Jan. 30, 1996
[51] Int. Cl.⁶ ........................................ C21D 8/02
[52] U.S. Cl. ............... 148/602; 148/603; 148/654; 148/575
[58] Field of Search ........................... 148/575, 602, 148/603, 654

[56] References Cited

U.S. PATENT DOCUMENTS

| | | |
|---|---|---|
| 3,164,896 | 1/1965 | Fullman . |
| 3,529,346 | 9/1970 | Grimoldi et al. . |
| 3,705,458 | 12/1972 | Vassar . |
| 3,920,173 | 11/1975 | Salata . |
| 3,921,883 | 11/1975 | McLain . |
| 3,972,744 | 8/1976 | Cantrell .................. 148/572 |
| 3,986,654 | 10/1976 | Hart et al. . |
| 4,010,969 | 3/1977 | Cantrell et al. .............. 148/643 |
| 4,796,679 | 1/1989 | Tsuta et al. . |
| 4,961,603 | 10/1990 | Carpenter ..................... 293/102 |
| 5,080,410 | 1/1992 | Stewart et al. . |
| 5,080,411 | 1/1992 | Stewart et al. . |
| 5,080,427 | 1/1992 | Sturrus et al. . |
| 5,092,512 | 3/1992 | Sturrus et al. .................. 228/146 |
| 5,104,026 | 4/1992 | Sturrus et al. .................. 228/17.5 |
| 5,306,058 | 4/1994 | Sturrus et al. .................. 293/154 |
| 5,395,036 | 3/1995 | Sturrus .......................... 228/146 |

OTHER PUBLICATIONS

SAE Technical Paper Series 900737 by James E. Borchelt Jack Shapiro and Bala Subbaraman dated Feb. 26–Mar. 2, 1990.

SAE Technical Paper Series 900428 by James E. Borchelt & Bala Subbaraman dated Feb. 26–Mar. 2, 1990.

Bumper Design Materials and Fabrication 730030 by R.R. Golze and R.F. Kienle dated Jan. 8–Dec. 1973.

*Primary Examiner*—Deborah Yee
*Attorney, Agent, or Firm*—Young & Basile, P.C.

[57] ABSTRACT

A bumper beam for vehicles is formed from cold-rolled sheet steel having an initial tensile strength of approximately 70 ksi. The steel sheet is roll formed in a desired cross-section and swept into a curvature corresponding to the vehicle requirements before the steel sheet is heat treated by induction heat and quenched to provide a bumper beam having a tensile strength from 100 ksi up to approximately 260 ksi.

18 Claims, 2 Drawing Sheets

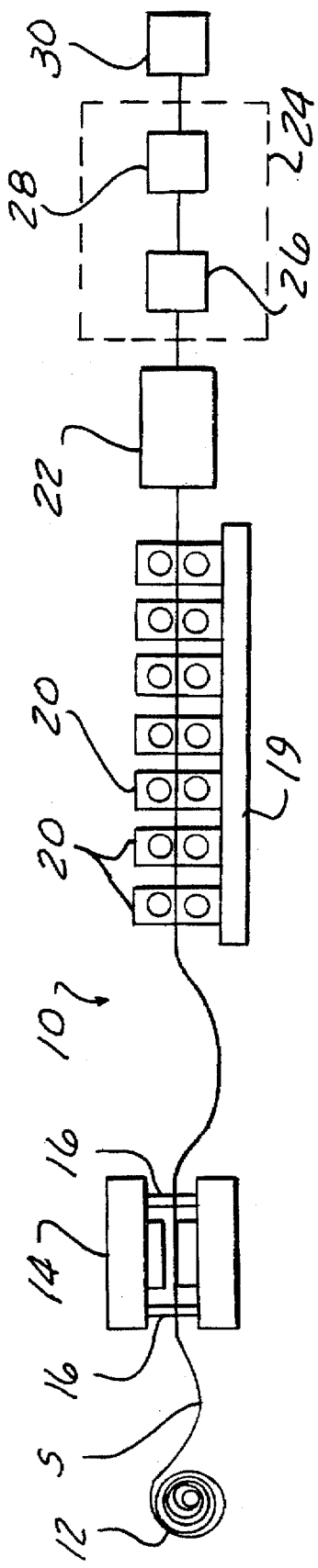
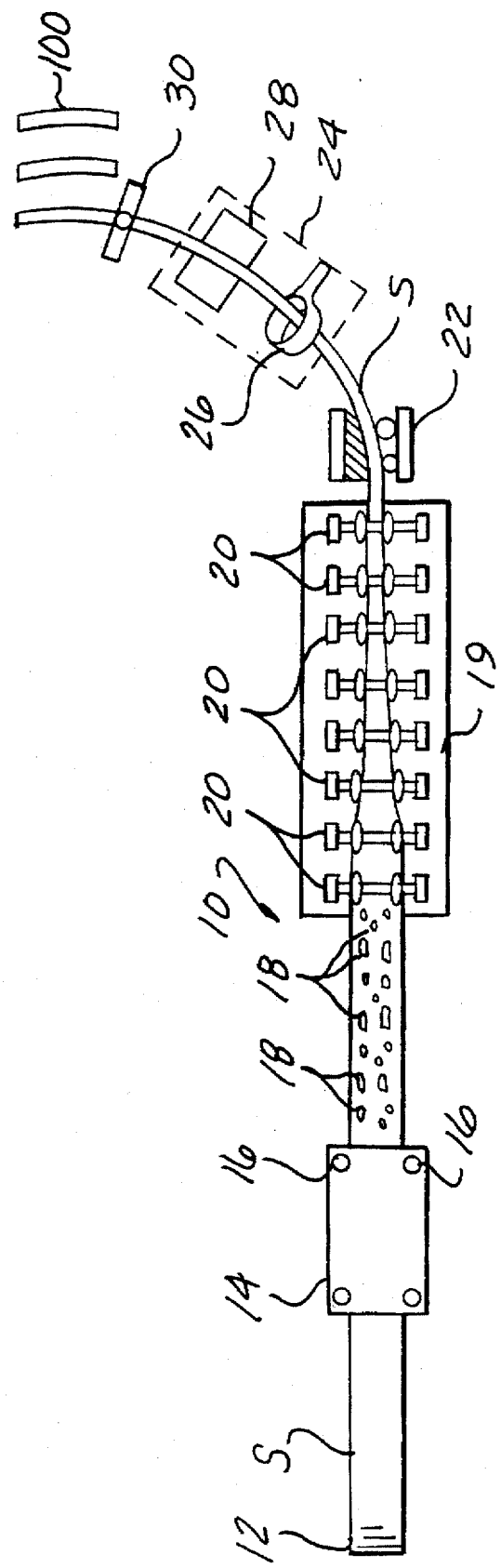
FIG-1
FIG-2

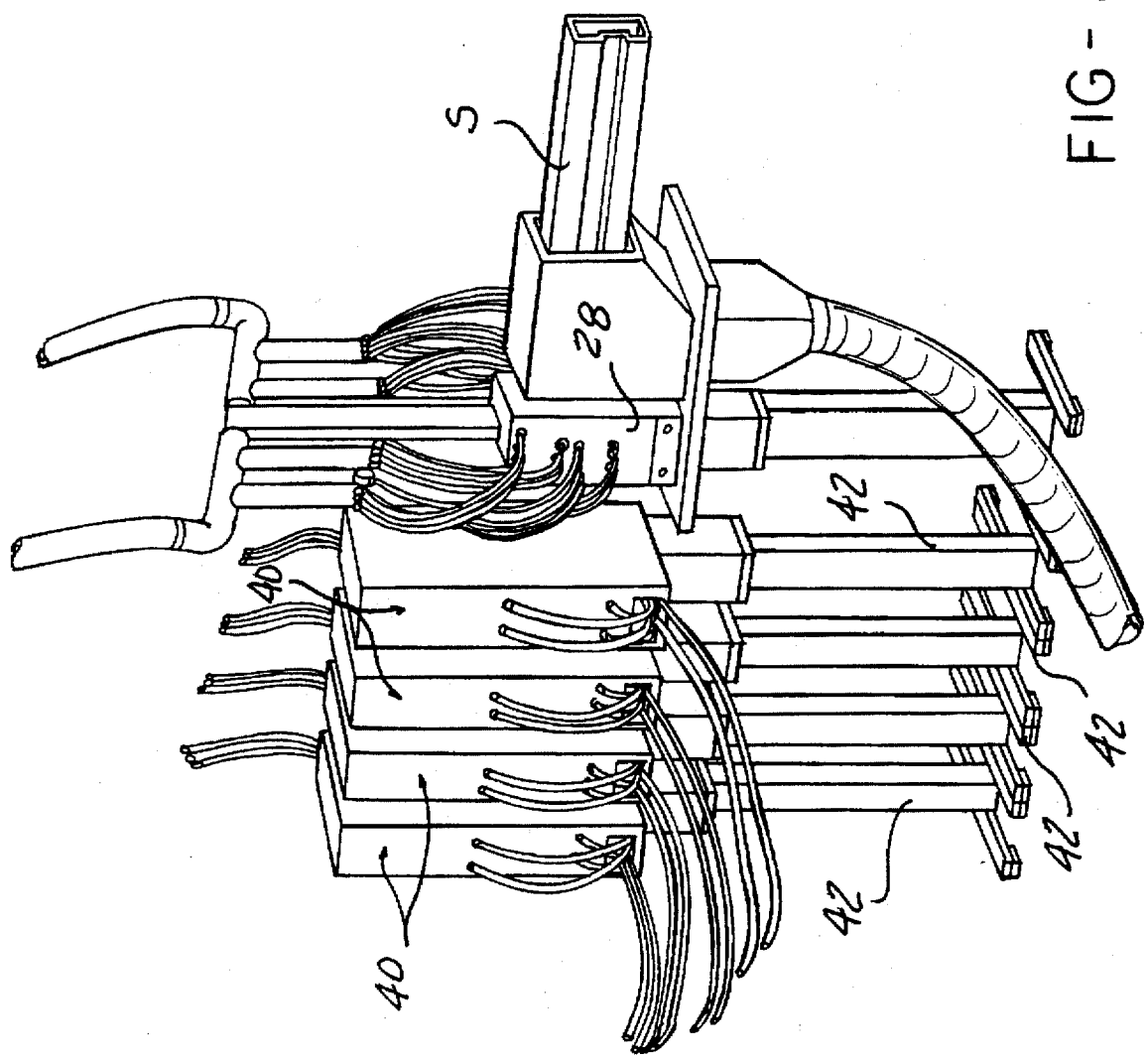

BUMPER BEAM MAKING PROCESS

FIELD OF THE INVENTION

A method for manufacturing an automobile bumper beam using a steel material having a tensile strength of approximately 70 ksi such that the resultant bumper beam has a tensile strength greater than 250 ksi.

BACKGROUND OF THE INVENTION

Automotive bumpers are designed to meet a number of low speed bumper impact requirements set by the government as well as by internal corporate standards. Simultaneously, fuel economy concerns have required that bumpers now be constructed to have low weight and aerodynamic configurations. In addition, the automobile manufacturer is always striving to meet consumer expectation and marketing competition to provide a low cost and safe vehicle. In this endeavor to meet sometimes conflicting requirements, many bumpers are composed of a bumper beam made from a variety of high strength steels that is overlayed with a layer of energy absorbing and aerodynamically formed facia. The weight and expense of the bumper lies in the material and manufacture of the bumper beam. The material strength and the configuration of the bumper beam affects the amount of added filler foam required for the facia to meet impact standards. The bumper beams are manufactured from high strength steels that are cold rolled into a variety of cross-sectional shapes. It has been desirable to use the highest strength steel available in the manufacture of the bumper beams in order to keep the overall strength of the bumper beam high while maintaining the thickness of the steel to a minimum.

Cold rolled steel sheets having a yield strength range of 50 to 180 ksi, and especially steel sheets having a yield strength greater than 80 ksi, are generally used for bumper reinforcement beams. Steel bumper beams having a yield strength of less than 80 ksi are subject to buckling. Therefore, bumper system designers have turned to ultra-high strength sheet steel (a steel having a yield strength greater than 100 ksi). The low availability and high cost of this ultra-high strength sheet steel has forced manufacturers of bumper beams to look at other material or other methods for producing a high strength bumper.

SUMMARY OF THE INVENTION

The present invention provides for a method of making a bumper beam from a steel material having a tensile strength approximately 70 ksi and a thickness less than 0.10 inches such that the resulting bumper beam has a tensile strength of greater than 250 ksi. The new process includes pre-notching the steel sheet with apertures for the connecting bolts during the bumper assembly, roll-milling the steel into a desired cross-section, sweeping the steel sheet to a predetermined curvature, heat treating and quenching the swept steel sheet to harden and strengthen the steel and finally cutting the resultant beams at the desired lengths.

The heat treatment process is accomplished by induction heating. Induction heating heats the steel into the austenite range. Once the steel is heated into the austenite range (a face-centered cubic structure in the temperature range of 1500° F. to 2000° F.), the steel is quenched. The quenching process results in a hard martensite (a body-centered cubic phase of iron) that is formed.

The resulting hardening of the steel sheets require extremely rapid surface cooling in the quench portion of the process. The ideal practical quench is one that will give the required surface cooling without agitation. The addition of salt may be added to improve the performance of water in this process. Most inorganic salts are effective in suppressing the formation of vapor at the surface of the steel and thus provide uniform cooling of the steel to eliminate the formation of soft spots.

The process of hardening and strengthening the steel sheet after the bumper beam configuration has been formed, allows a more available, low hardenability steel to be initially used that is easier to cold form and sweep into the desired configuration, but yet attains the strength and hardenability of a high strength steel for the completed bumper beam.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a schematic view of the bumper beam process apparatus having a heat treatment and quenching unit for practice in the process of this invention;

FIG. 2 is a top view of the units as shown in FIG. 1; and

FIG. 3 is a perspective view of the heat treatment and quenching unit for this invention.

DESCRIPTION OF THE PREFERRED EMBODIMENT

Looking at schematics in FIGS. 1 and 2, a roll of flat sheeting steel in the form a strip S is located on a coil 12 which rotatably supports the steel strip S. The preferred material composition of the steel is 0.15–0.30 Carbon (C), 1.0–1.5 Manganese (Mn), and 0.010–0.030 Columbium (Cb) Because the process in this invention produces a bumper beam 100 having a significantly higher tensile strength (TS) than that of the steel initially used, the tensile strength of the original sheet material in coil 12 is preferably between 70–75 ksi (ksi=1000 pounds of force per square inch). The original yield strength (YS) is 50–60 ksi, and the elongation (El) of 20–25%. The thickness range of the steel metal sheeting is from 0.030 to 0.070 inches. The steel strip S is fed on a conveyor system 10 through the beam process apparatus. The steel strip S first passes into a press 14 having spaced dies 16 for punching pre-notched slots 18 into the steel strip S. The plurality of slots 18 extending through the sheet S provide openings for bolt and nut structures to secure the bumper beam to a bracket and ultimately to a front facia portion. Any large hole punch out notches that may be required for the design and configuration of the bumper is generally done after the sheet S is formed and hardened. The pre-notched sheet S then extends and is fed into a roll-mill 19 having a series of roller assemblies 20. The roller assemblies 20 shape the strip as it is passed therethrough, so that the strip of steel S is gradually formed into the desired cross-sectional shape. Although eight roller assemblies 20 are disclosed, the number of roller assemblies can substantially increase or decrease depending upon the complexity of the cross-sectional shape.

The steel strip S is next passed into the sweep mechanism 22. The sweep mechanism 22 provides a process that defines the curvature of the bumper beam 100. The higher the sweep number attained, the smaller the radius of curvature for the bumper. The advantage of having a large sweep in the bumper beam 100 is to provide a space behind the central portion of the bumper beam 100 for the engine and other components and to permit deflection of the bumper beam in the event of impact without damaging structure behind the bumper beam 100. By increasing the sweep of the bumper beam 100, the amount of filler foam support for the front facia is reduced or eliminated. This can result in a significant savings per vehicle.

In the prior art, it has been difficult to attain a large sweep when using a high strength steel, because the high strength steels have a reduced ductility which results in fracturing more easily in the forming and shaping process. In the current invention, the steel material entering the sweep mechanism 22 has a lower tensile strength and hardenability and an increased ductility than what was used in the prior art. Therefore, the process to form the bumper beam curvature, i.e. sweep, is made considerably easier than if using an ultra-high strength steel. Although the current material composition and process can provide an unlimited sweep, sweep numbers of 50–70 are adequate for most bumper configurations.

After the steel S leaves the sweep mechanism 22 in the desired bumper curvature, the steel may enter an atmospheric chamber 24, wherein the chamber 24 is at atmospheric temperature and pressure and is filled with an inert gas. If necessary, the steel sheet S is heat treated and quenched within the atmospheric chamber 24. The atmospheric chamber 24 exposes the steel S to only inert gas during these functions to prevent oxidation and the formation of scales on the steel surface so that the bumper beam can be later painted, if desired. The heat treatment process is accomplished by means of induction hardening 26. The steel sheet S is heated by a series of induction heaters 40 (FIG. 3) that are placed in the chamber 24 to conform to the curvature of the bumper beam. In the preferred embodiment, one or more heaters 40 are used. Each induction heater 40 is placed on a movable structure 42 so that the heaters 40 can be moved to accommodate bumper beams 100 having different curvatures. In this manner, the entire length of a bumper beam 100 is treated continuously. The induction heaters 40 heat the steel S to a temperature of 1500° F.–2000° F. at a rate of about 1000° F./sec for about 2 seconds with a maximum of 4 seconds.

Once the steel is heated into the austenite range, the steel sheet S is immediately sent to a quench unit 28 where the steel S is quenched in a water solution at approximately 70° F.–150° F., and preferably 85° F. Currently, undiluted water is being used for the quenching process, although it is within the scope of the invention to use water solutions containing various salts. The steel sheet S is totally immersed or sprayed in recirculated water so that the steel sheet S decreases in temperature of about 1000° F./sec. Quenching provides a hard martensitic microstructure. The resultant steel has a yield strength (YS) from 80 ksi up to approximately 185 ksi, a tensile strength (TS) from 100 ksi to approximately 260 ksi and an elongation (El) of 4.5–11.0%.

After the steel sheet S has been heat treated by means of induction heat and quenched in a water or blended solution, the bumper beam 100 leaves the atmospheric chamber 24 and is cut-off at a predetermined length by the cut-off apparatus 30 to provide the completed bumper beam 100.

The completed bumper beam assembly may then also be sent through a paint bake cycle at a temperature of 350°–450° for approximately 20 minutes. This final step provides stress relief to the assembly as well as improves ductility.

The preferred method discloses the process of cutting the bumper beams to size after heat treating and quenching the steel sheet S to harden the steel. The hardening process can also be accomplished after the cut-off apparatus 30 has cut the bumper beam 100 to size. After sweeping the steel at sweep mechanism 22, the formed steel sheet S can be cut at predetermined lengths and then sent on the conveyor system 10 and magazine fed in an end-to-end abutting and continuous fashion through the atmospheric chamber 24 for the hardening process.

The process of the current invention provides a number of advantages including the initial material cost savings of the lower strength steel material. The lower strength steel material is more ductile than the high strength steel which allows the cold forming and sweeping functions to be easier with reduced occurrences of fractures in the steel. The lower strength steel material allows for a higher sweep of the bumper to be attained so that less foam filler is required to protect the engine and its components from impact. Finally, the process produces a bumper beam having a higher yield and tensile strength than bumper beams manufactured in the prior art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for forming a bumper beam for a vehicle comprising the steps in the sequence set fourth:

feeding a steel sheet from a coil along a pathways wherein the sheet is made of a sheet material having a tensile strength less than 80 ksi and a yield strength between 50–60 ksi;

feeding the steel sheet through a roll mill to shape the cross-sectional area of the steel sheet into a bumper beam form;

hardening the steel sheet by heat treating the steel sheet, then quenching the steel sheet to provide a steel sheet having a yield strength greater than 80 ksi and a tensile strength greater than 100 ksi and then cutting the steel at specified lengths to provide completed bumper beams.

2. The method of claim 1 wherein heat treating the steel sheet includes the step of:

induction heating the steel sheet by providing induction heaters on a movable structure adjacent the pathway.

3. The method of claim 2, wherein the heat treating step further includes the step of increasing the temperature of the steel sheet at a rate of about 1000° F./sec.

4. The method of claim 3, wherein the heat treating step further includes the step of increasing the temperature of the steel sheet to a range of 1500° F.–2000° F. for about two seconds.

5. The method of claim 1, wherein quenching the steel sheet includes the step of decreasing the temperature of the steel sheet at a rate adequate to create a martensitic microstructure.

6. The method of claim 5, wherein quenching the steel sheet includes the step of exposing the steel sheet in a water solution by one of the means of immersing and spraying; wherein the temperature of the water solution is in the range of 70° F.–150° F.

7. The method of claim 1, further including the step of enclosing the heat treatment means and quenching means within an atmospheric chamber filled with an inert gas.

8. The method of claim 1, further including the step of providing a composition of steel for the coil comprising the materials of carbon, manganese and columbium.

9. The method of claim 8, wherein the composition of the steel comprises 0.15–0.30 carbon, 1.0–1.50 manganese and 0.010–0.030 columbium.

10. The method of claim 8 wherein the steel material provided for the coil has a thickness of 0.030–0.070 inches.

11. The method of claim 1, further including the step of cutting the steel at specified lengths before heat treating the steel sheet, wherein the cut sheets are abutted end to end so that the sheets are continuously fed when heat treated.

12. The method of claim 1, further including the step of:
forming notches for openings for bolts and nuts in the steel sheet at specified locations before feeding the steel sheet through the roll mill.

13. A method for forming a bumper beam for a vehicle, comprising the steps in the sequence set forth:
feeding a continuous steel sheet from a coil along a conveyor assembly, wherein the steel sheet comprises a material of carbon, manganese and columbium and having a yield strength between 50–60 ksi, a tensile strength less than 80 ksi, and a thickness between 0.030 and 0.070 inches;
passing said steel sheet through a punch press to form through slots therein;
feeding the steel sheet through a roll mill to shape the cross-sectional area of the steel sheet into a bumper beam form;
sweeping the steel sheet into a specified curvature;
feeding said swept steel sheet into an enclosed chamber filled with inert gas and having a heat treatment means and quenching means therein;
heat treating the steel sheet by applying current along the surface of the steel sheet to a temperature range of 1500° F.–2000° F. at a rate of about 1000° F./sec for about two seconds; and
then quenching said steel sheet by quickly immersing the steel sheet in a water solution having a temperature range approximately 70° F.–150° F. to decrease the temperature of the steel sheet at a rate of about 1000° F./sec to produce martensite.

14. The method of claim 13, further including the step of cutting the steel sheet at specified lengths after sweeping the steel sheet into a specified curvature to produce bumper beams.

15. The method of claim 14, further including the step of forming large hole punch out notches after heat treating the steel sheet.

16. The method of claim 1 further including the step of heating the bumper beam in a paint bake cycle at a temperature of 350°–450° for approximately 20 minutes.

17. The method of claim 1 further including the step of sweeping steel sheet.

18. A method for forming a bumper beam far a vehicle comprising the steps in the sequence set fourth:
feeding a steel sheet from a coil along a pathway;
feeding the steel sheet through a roll mill to shape the cross-sectional area of the steel sheet into a bumper beam form;
hardening the steel sheet by heat treating the steel sheet, then quenching the steel sheet to provide a steel sheet having a yield strength greater than 80 ksi and a tensile strength greater than 100 ksi and then cutting the steel at specified lengths to provide completed bumper beams.

* * * * *